US008649100B2

(12) United States Patent
Liu et al.

(10) Patent No.: US 8,649,100 B2
(45) Date of Patent: Feb. 11, 2014

(54) METAMATERIAL FOR SEPARATING ELECTROMAGNETIC WAVE BEAM

(75) Inventors: Ruopeng Liu, Guangdong (CN); Guanxiong Xu, Guangdong (CN); Yangyang Zhang, Guangdong (CN)

(73) Assignees: Kuang-Chi Innovative Technology Ltd., FuTian District, Shenzhen, Guangdong (CN); Kuang-Chi Institute of Advanced Technology, High-Tech Industrial Estate, Nanshan District, Shenzhen, Guangdong (CN)

( * ) Notice: Subject to any disclaimer, the term of this patent is extended or adjusted under 35 U.S.C. 154(b) by 15 days.

(21) Appl. No.: 13/522,716

(22) PCT Filed: Nov. 28, 2011

(86) PCT No.: PCT/CN2011/083039
§ 371 (c)(1),
(2), (4) Date: Jul. 18, 2012

(87) PCT Pub. No.: WO2012/142836
PCT Pub. Date: Oct. 26, 2012

(65) Prior Publication Data

US 2013/0016432 A1 Jan. 17, 2013

(30) Foreign Application Priority Data

Apr. 20, 2011 (CN) .......................... 2011 1 0099326

(51) Int. Cl.
*G02B 27/10* (2006.01)

(52) U.S. Cl.
USPC .......................................................... 359/634

(58) Field of Classification Search
USPC ............. 359/485.05, 487.03, 489.08, 489.11, 359/618, 629, 634, 637
See application file for complete search history.

(56) References Cited

U.S. PATENT DOCUMENTS 7,522,124 B2 * 4/2009 Smith et al. .................. 343/909

* cited by examiner

*Primary Examiner* — Joseph P Martinez
(74) *Attorney, Agent, or Firm* — Winston Hsu; Scott Margo

(57) ABSTRACT

A metamaterial for separating an electromagnetic wave beam is disclosed. Two kinds of man-made microstructures are attached on a substrate of the metamaterial. The first man-made microstructures each have a principal optical axis parallel to a first electric field direction, and the second man-made microstructures each have a principal optical axis parallel to a second electric field direction. The metamaterial comprises a first region and a second region. The first man-made microstructures in the first region have the largest geometric size and the first man-made microstructures in other regions increase in geometric size continuously in a direction towards the first region; and the second man-made microstructures in the second region have the largest geometric size and the second man-made microstructures in other regions increase in geometric size continuously in a direction towards the second region.

13 Claims, 4 Drawing Sheets

METAMATERIAL FOR SEPARATING ELECTROMAGNETIC WAVE BEAM

FIELD OF THE INVENTION

The present disclosure generally relates to the technical field of metamaterials, and more particularly, to a metamaterial for separating an electromagnetic wave beam.

BACKGROUND OF THE INVENTION

A metamaterial is formed of a substrate made of a non-metal material and a plurality of man-made microstructures attached on a surface of the substrate or embedded inside the substrate. Each of the man-made microstructures is of a two-dimensional (2D) or three-dimensional (3D) structure consisting of at least one metal wire. Each of the man-made microstructures and a substrate portion to which it is attached form one metamaterial unit cell. Correspondingly, just like a crystal which is formed of numerous crystal lattices arranged in a certain manner, the whole metamaterial consists of hundreds of or thousands of or millions of or even hundreds of millions of such metamaterial unit cells, with each of the lattices corresponding to a metamaterial unit cell formed by one man-made microstructure and the substrate portion as described above.

Due to presence of the man-made microstructures, each of the metamaterial cells presents an equivalent dielectric constant and equivalent magnetic permeability that are different from those of the substrate per se. Therefore, the metamaterial comprised of all the unit cells exhibits special response characteristics to the electric field and the magnetic field. Meanwhile, by designing the man-made microstructures into different structures and sizes, the dielectric constant and the magnetic permeability of the metamaterial unit cells and, consequently, the response characteristics of the whole metamaterial can be changed.

In prior art, some uniaxial crystals such as calcites, quartzes and the like must be used in order to separate an electromagnetic wave beam. Because these crystals are mostly naturally occurring materials and their response characteristics to electromagnetic wave beams are invariable, it is impossible to flexibly control exiting angles of the separated electromagnetic waves. Consequently, these crystals cannot be widely used flexibly. Moreover, the natural crystals have limited sizes and also it is difficult to produce a man-made crystal with a large size; and if a number of crystals produced are spliced or bonded together to produce a larger crystal, then refraction and reflection caused by the joining or bonding surface would adversely affect the effect of separating the electromagnetic wave beam.

SUMMARY OF THE INVENTION

An objective of the present disclosure is to provide a metamaterial for separating an electromagnetic wave beam, which can flexibly control exiting angles of electromagnetic waves and allow for separation of a large-area electromagnetic wave beam.

To achieve the aforesaid objective, the present disclosure provides a metamaterial for separating an electromagnetic wave beam, which is adapted to separate two incident electromagnetic waves whose electric fields are orthogonal to each other. The metamaterial comprises at least one metamaterial sheet layer. Each of the at least one metamaterial sheet layer comprises a substrate, and first man-made microstructures and second man-made microstructures arranged in an array form on the substrate. Each of the first man-made microstructures has a principal optical axis parallel to a first electric field direction, and each of the second man-made microstructures has a principal optical axis parallel to a second electric field direction. The metamaterial comprises a first region and a second region. The first man-made microstructures in the first region have the largest geometric size and the first man-made microstructures in other regions increase in geometric size continuously in a direction towards the first region; and the second man-made microstructures in the second region have the largest geometric site and the second man-made microstructures in other regions increase in geometric size continuously in a direction towards the second region. The first man-made microstructures and the second man-made microstructures are arranged on two opposite surfaces of the substrate in an array form respectively. The first man-made microstructures and the second man-made microstructures are each of a non-90° rotationally symmetrical structure. The first man-made microstructures are each of a "工" form or a "王" form, and the second man-made microstructures are each of an "H" form.

According to a preferred embodiment of the present disclosure, each of the first man-made microstructures and the second man-made microstructures is of a two-dimensional (2D) or three-dimensional (3D) structure comprising at least one metal wire.

According to a preferred embodiment of the present disclosure, the metamaterial comprises a plurality of metamaterial sheet layers having inhomogeneous dielectric constant distributions that are stacked together in a direction perpendicular to a surface of each of the sheet layers.

To achieve the aforesaid objective, the present disclosure further provides a metamaterial for separating an electromagnetic wave beam, which is adapted to separate two incident electromagnetic waves whose electric fields are orthogonal to each other. The metamaterial comprises at least one metamaterial sheet layer. Each of the at least one metamaterial sheet layer comprises a substrate, and first man-made microstructures and second man-made microstructures arranged in an array form respectively on the substrate. Each of the first man-made microstructures has a principal optical axis parallel to a first electric field direction, and each of the second man-made microstructures has a principal optical axis parallel to a second electric field direction. The metamaterial comprises a first region and a second region. The first man-made microstructures in the first region have the largest geometric size and the first man-made microstructures in other regions increase in geometric size continuously in a direction towards the first region; and the second man-made microstructures in the second region have the largest geometric size and the second man-made microstructures in other regions increase in geometric size continuously in a direction towards the second region.

According to a preferred embodiment of the present disclosure, the first man-made microstructures and the second man-made microstructures are arranged on two opposite surfaces of the substrate in an array form respectively.

According to a preferred embodiment of the present disclosure, the metamaterial comprises a plurality of metamaterial sheet layers having inhomogeneous dielectric constant distributions that are stacked together in a direction perpendicular to a surface of each of the sheet layers.

According to a preferred embodiment of the present disclosure, each of the first man-made microstructures and the second man-made microstructures is of a 2D or 3D structure comprising at least one metal wire.

According to a preferred embodiment of the present disclosure, the at least one metal wire is at least one copper wire or silver wire.

According to a preferred embodiment of the present disclosure, the at least one metal wire is attached on the substrate through etching, electroplating, drilling, photolithography, electron etching or ion etching.

According to a preferred embodiment of the present disclosure, the substrate is made of polymer materials, ceramic materials, ferro-electric materials, ferrite materials or ferromagnetic materials.

According to a preferred embodiment of the present disclosure, the first man-made microstructures and the second man-made microstructures are each of a non-90° rotationally symmetrical structure.

According to a preferred embodiment of the present disclosure, the first man-made microstructures are each of a " 工 " form or a " 王 " form.

According to a preferred embodiment of the present disclosure, the second man-made microstructures are each of an "H" form.

The aforesaid technical solutions have at least the following benefits: by virtue of the principal that responses of the man-made microstructures to the electric fields are related to structures thereof and the principle that an inhomogeneous metamaterial can deflect electromagnetic waves, the metamaterial of the present disclosure can separate an incident electromagnetic wave beam, flexibly control exiting angles of the separated electromagnetic waves and allow for separation of a large-area electromagnetic wave beam.

BRIEF DESCRIPTION OF THE DRAWINGS

To describe the technical solutions of embodiments of the present disclosure more clearly, the attached drawings necessary for description of the embodiments will be introduced briefly hereinbelow. Obviously, these attached drawings only illustrate some of the embodiments of the present disclosure, and those of ordinary skill in the art can further obtain other attached drawings according to these attached drawings without making inventive efforts. In the attached drawings.

DETAILED DESCRIPTION OF THE INVENTION

Figure 1:
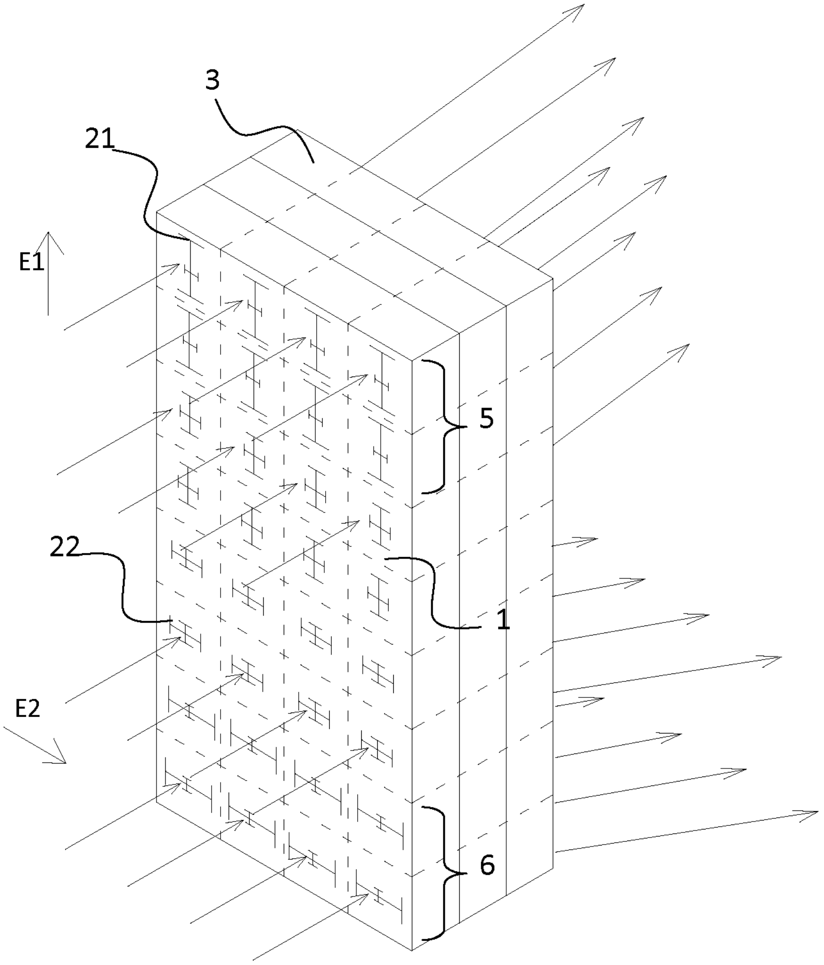
FIG. 1 is a schematic structural view of a metamaterial for separating an electromagnetic wave beam according to a first embodiment of the present disclosure.

A metamaterial 10 for separating an electromagnetic wave beam according to the present disclosure is adapted to separate two incident electromagnetic waves whose electric fields are orthogonal to each other. Referring to FIG. 1, there is shown a schematic view of a first embodiment of the metamaterial 10. The metamaterial 10 comprises at least one metamaterial sheet layer 3. The metamaterial sheet layers 3 are arranged and assembled together equidistantly, or are stacked together with a front surface of one sheet layer 3 making direct contact with a back surface of an adjacent sheet layer 3. Each of the sheet layers 3 further comprises a sheet-like substrate 1 of which a front surface and a back surface are parallel to each other, and first man-made microstructures 21 and second man-made microstructures 22 disposed in an array form respectively on the substrate 1.

The first man-made microstructures 21 and the second man-made microstructures 22 are each of a 2D or 3D structure consisting of at least one metal wire. Each of the first man-made microstructures 21 and each of the second man-made microstructures 22 together with a portion of the substrate 1 that they occupy form one metamaterial unit cell 4. The substrate 1 may be made of any material that is different from that of the first man-made microstructures 21 and the second man-made microstructures 22. Simultaneous use of the two different materials imparts to each of the metamaterial unit cells 4 an equivalent dielectric constant and an equivalent magnetic permeability, which correspond to the response of the metamaterial unit cell 4 to electric field and the response of the metamaterial unit cell 4 to magnetic field respectively, so different responses to the electromagnetic fields can be obtained.

Two requirements must be satisfied in order to separate two electromagnetic waves whose electric fields are orthogonal to each other. The first one is that the metamaterial 10 is attached with man-made microstructures that can make responses to the two kinds of electric fields respectively. In order to have a man-made microstructure make a response to an electric field, a principal optical axis of the man-made microstructure must be parallel to a direction of the electric field; that is, the man-made microstructure must have a projection in the electric field direction and the projection shall not be a point but be a line segment having a length. For example, when the electric field is in a vertical direction and the man-made microstructure is a straight metal line in a horizontal direction, then the projection of the man-made microstructure in the vertical direction will not be a line segment having a length and, therefore, the man-made microstructure will not make a response to the electric field. However, if the man-made microstructure is a metal wire in the vertical direction, then the man-made microstructure will be able to make a response to this electric field.

In this embodiment, each of the first man-made microstructures 21 attached on the metamaterial 10 has a principle optical axis in the vertical direction, which is parallel to the vertical first electric field direction; and each of the second man-made microstructures 22 attached on the metamaterial 10 has a principle optical axis in the horizontal direction, which is parallel to the horizontal second electric field direction. Therefore, the first man-made microstructures 21 can make a response to the first electric field, and the second man-made microstructures 22 can make a response to the second electric field.

As the second requirement that must be satisfied to separate two electromagnetic waves whose electric fields are orthogonal to each other, the metamaterial 10 shall be able to deflect the two incident electromagnetic waves into different directions. When an electromagnetic wave propagates from one medium into another, the electromagnetic wave will be refracted. If there is a nonuniform distribution of refractive indices in the material, then the electromagnetic wave deflects in a direction towards a great refractive index. The refractive index for an electromagnetic wave is directionally proportional to $\sqrt{\epsilon \times \mu}$, so the propagation path of the electromagnetic wave can be changed by changing the distributions of the dielectric constant ∈ or the magnetic permeability μ in the material.

Electromagnetic response characteristics of the metamaterial are determined by the features of the man-made microstructures which, in turn are largely determined by the topology and geometric size of the metal wire pattern of the man-made microstructures. By designing the pattern and the geometric size of each of the first man-made microstructures 21 and the second man-made microstructures 22 arranged in the metamaterial space according to the aforesaid principles, electromagnetic parameters of each point in the metamaterial can be designed to achieve separation of two electromagnetic waves whose electric fields are orthogonal to each other.

There are many ways to implement the first man-made microstructures 21 and the second man-made microstructures 22 that satisfy the aforesaid requirements. The first man-made microstructures 21 and the second man-made microstructures 22 shown in FIG. 1 are each of a non-90° rotationally symmetric structure. The first man-made microstructures 21 are each of a "工" form, which includes a vertical first metal wire and second metal wires connected to two ends of the first metal wire and perpendicular to the first metal wire respectively. The first metal wire has a length L1, each of the second metal wires has a length L2, and L1>>L2. The first man-made microstructures 21 each have a principle optical axis parallel to the vertical first electric field direction, so they can make a response to the vertical electric field. The second man-made microstructures 22 are each of an "II" form, which includes a horizontal third metal wire and fourth metal wires connected to two ends of the third metal wire and perpendicular to the third metal wire respectively. The third metal wire has a length L3, the fourth metal wire has a length L4, and L3>>L4. The second man-made microstructures 22 each have a principle optical axis parallel to the horizontal second electric field direction, so they can make a response to the horizontal electric field.

The metamaterial 10 shown in FIG. 1 comprises a first region 5 and a second region 6 opposite to the first region 5. The first man-made microstructures 21 in the first region 5 have the largest geometric size and the first man-made microstructures 21 in other regions increase in geometric size continuously in a direction towards the first region 5. The second man-made microstructures 22 in the second region 6 have the largest geometric size and the second man-made microstructures 22 in other regions increase in geometric size continuously in a direction towards the second region 6. opposite to the direction towards the first region 5. When two electromagnetic waves whose electric fields are orthogonal to each other propagate through the metamaterial 10, the first man-made microstructures 21 can make a response to the vertical electric field, and the electromagnetic wave having the vertical electric field direction deflects in a direction towards the first region 5; and the second man-made microstructures 22 can make a response to the horizontal electric field, and the electromagnetic wave having the horizontal electric field direction deflects in a direction towards the second region 6. Thus, separation of the two electromagnetic waves is achieved. Through different arrangements of the first man-made microstructures 21 and the second man-made microstructures 22 of different sizes, different exiting effects can be accomplished.

Figure 2:
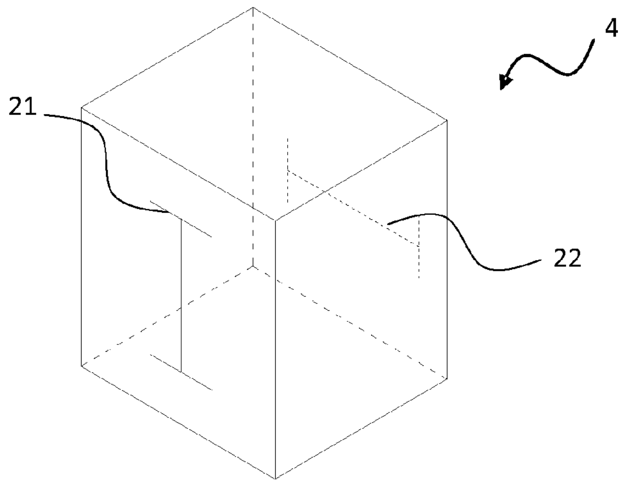
FIG. 2 is a schematic structural view of a metamaterial unit cell according to a second embodiment of the present disclosure.
Figure 3:
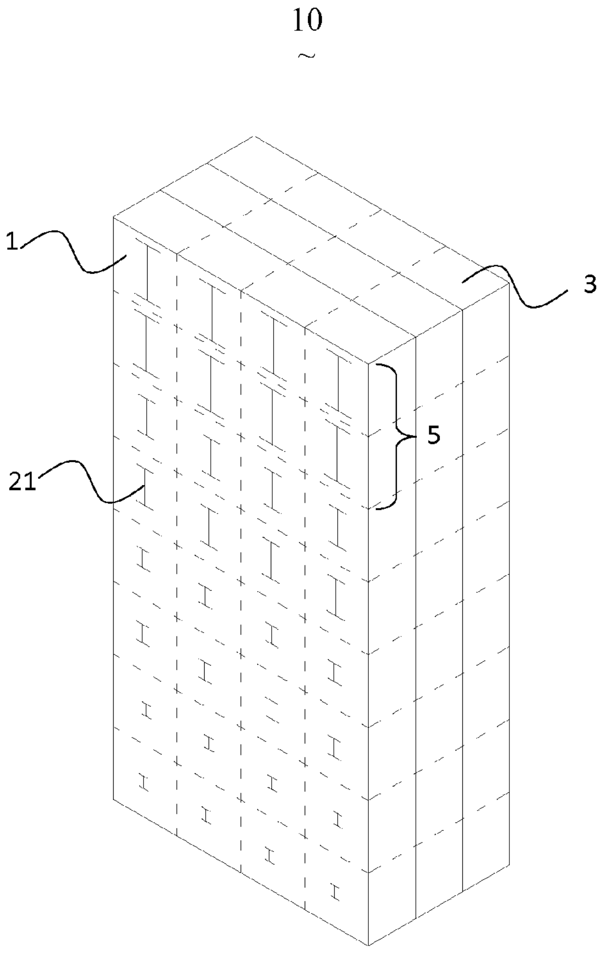
FIG. 3 is a schematic structural view of a metamaterial for separating an electromagnetic wave beam that is comprised of a plurality of metamaterial unit cells shown in FIG. 2.
Figure 4:
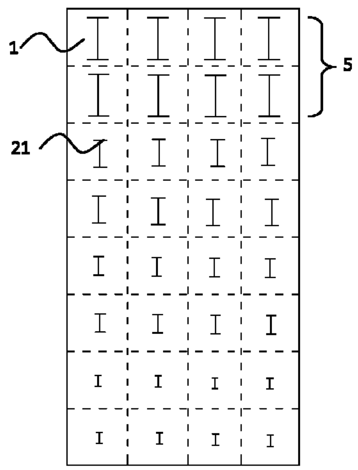
FIG. 4 is a front view of the metamaterial for separating an electromagnetic wave beam shown in FIG. 3.
Figure 5:
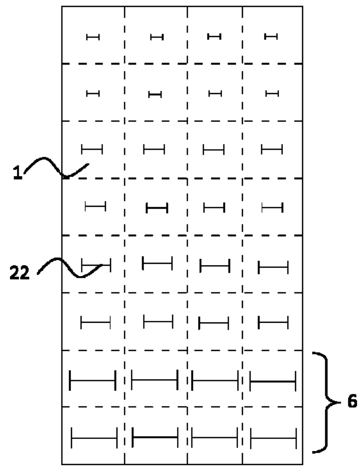
FIG. 5 is a back view of the metamaterial for separating an electromagnetic wave beam shown in FIG. 3.

FIG. 3 is a schematic structural view of a second embodiment of the metamaterial 10 according to the present disclosure. In this embodiment, the metamaterial 10 is formed of a plurality of metamaterial unit cells 4 arranged in an array form. FIG. 2 is a schematic view of an embodiment of a metamaterial unit cell 4 of the metamaterial 10. In this embodiment, the first man-made microstructures 21 and the second man-made microstructures 22 are arranged in an array form on two opposite side surfaces of the substrate 1 respectively. The embodiment shown in FIG. 3 differs from the embodiment shown in FIG. 1 in that, the first man-made microstructures 21 and the second man-made microstructures 22 are arranged on opposite side surfaces respectively, but not on a same surface as in the embodiment shown in FIG. 1; and other aspects including distributions of the first man-made microstructures 21 and the second man-made microstructures 22 are all the same as the embodiment shown in FIG. 1. FIG. 4 and FIG. 5 are a front view and a back view of the metamaterial 10 shown in FIG. 3 respectively. In this embodiment, the metamaterial 10 comprises a first region 5 and a second region 6. The first man-made microstructures 21 in the first region 5 have the largest geometric size and the first man-made microstructures 21 in other regions increase in geometric size continuously in a direction towards the first region 5. The second man-made microstructures 22 in the second region 6 have the largest geometric size and the second man-made microstructures 22 in other regions increase in geometric size continuously in a direction towards the second region 6. When two electromagnetic waves whose electric fields are orthogonal to each other propagate through the metamaterial 10, the first man-made microstructures 21 can make a response to the vertical electric field, and the electromagnetic wave having the vertical electric field direction deflects in a direction towards the first region 5; and the second man-made microstructures 22 can make a response to the horizontal electric field, and the electromagnetic wave having the horizontal electric field direction deflects in a direction towards the second region 6. Thus, separation of the two electromagnetic wave is achieved. Through different arrangements of the first man-made microstructures 21 and the second man-made microstructures 22 of different sizes, different exiting effects can be accomplished.

In practical implementations, each of the man-made microstructures comprises at least one metal wire (e.g., copper wire or silver wire) of a specific pattern. The at least one metal wire may be attached on the substrate 1 through etching, electroplating, drilling, photolithography, electro etching, ion etching and the like processes. Preferably, the etching process is used. In the etching process, after an appropriate 2D pattern of man-made microstructures is designed, a metal foil as a whole is attached on the substrate 1, and then through a chemical reaction of a solvent with the metal in an etching apparatus, foil portions other than portions corresponding to the preset pattern of man-made microstructures are removed to obtain the man-made microstructures arranged in an array form. The substrate 1 may be made of polymer materials, ceramic materials, ferro-electric materials, ferrite materials or ferro-magnetic materials. For the polymer material, polytetrafluoroethylene (PTFE), FR4 or F4B may be adopted.

Figure 6:
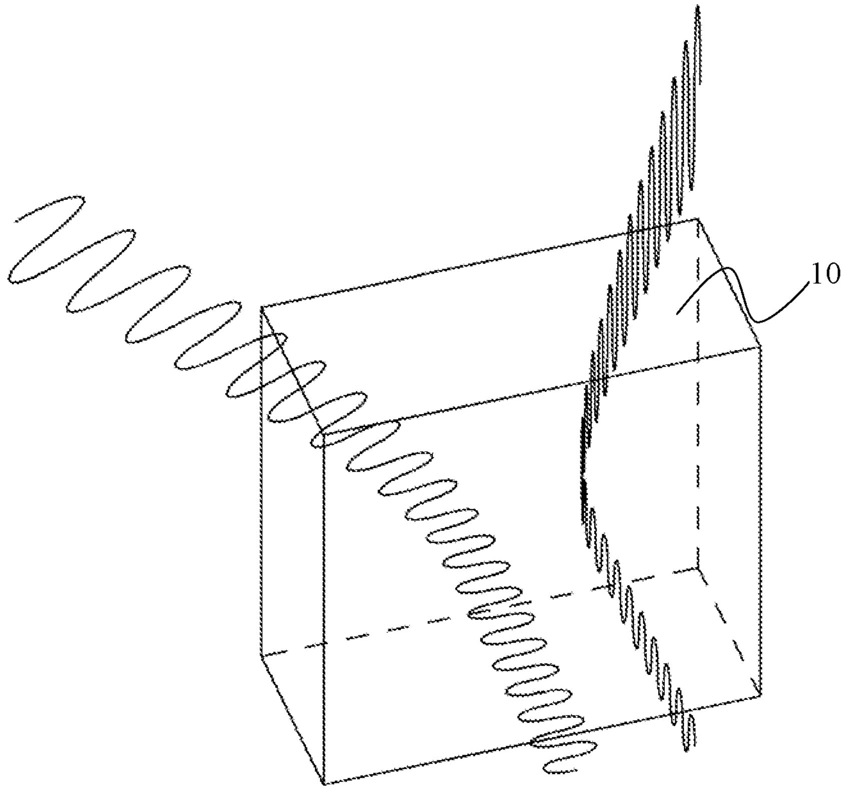
FIG. 6 is a schematic view illustrating an application of a metamaterial for separating an electromagnetic wave beam according to an embodiment of the present disclosure.

FIG. 6 is a schematic view illustrating an application of a metamaterial for separating an electromagnetic wave beam according to the present disclosure. By arranging two kinds of man-made microstructures, which can make responses to two orthogonal electric fields respectively, on the substrate 1 and through design of arrangements of the first man-made microstructures 21 and the second man-made microstructures 22, different exiting effects can be achieved for two electromagnetic waves, thus achieving separation of the two electromagnetic waves.

What described above are embodiments of the present disclosure. It shall be appreciated that, various alterations and modifications may be made by those of ordinary skill in the art without departing from the scope of the disclosure, and all these alterations and modifications shall be considered to fall within the scope of the present disclosure.

What is claimed is:

1. A metamaterial for separating an electromagnetic wave beam, being adapted to separate two incident electromagnetic waves whose electric fields are orthogonal to each other, wherein the metamaterial comprises at least one metamaterial sheet layer, each of the at least one metamaterial sheet layer comprises a substrate, and first man-made microstructures and second man-made microstructures arranged in an array form on the substrate, each of the first man-made microstructures has a principal optical axis parallel to a first electric field direction, each of the second man-made microstructures has a principal optical axis parallel to a second electric field direction, the metamaterial comprises a first region and a second region, the first man-made microstructures in the first region have the largest geometric size and the first man-made microstructures in other regions increase in geometric size continuously in a direction towards the first region, the second man-made microstructures in the second region have the largest geometric size and the second man-made microstructures in other regions increase in geometric size continuously in a direction towards the second region, the first man-made microstructures and the second man-made microstructures are arranged on two opposite surfaces of the substrate in an array form respectively, the first man-made microstructures and the second man-made microstructures are each of a non-90° rotationally symmetrical structure, the first man-made microstructures are each of a "⌶" form or a "王" form, and the second man-made microstructures are each of an "H" form.

2. The metamaterial for separating an electromagnetic wave beam of claim 1, wherein each of the first man-made microstructures and the second man-made microstructures is of a two-dimensional (2D) or three-dimensional (3D) structure comprising at least one metal wire.

3. The metamaterial for separating an electromagnetic wave beam of claim 1, wherein the metamaterial comprises a plurality of metamaterial sheet layers having inhomogeneous dielectric constant distributions that are stacked together in a direction perpendicular to a surface of each of the sheet layers.

4. A metamaterial for separating an electromagnetic wave beam, being adapted to separate two incident electromagnetic waves whose electric fields are orthogonal to each other, wherein the metamaterial comprises at least one metamaterial sheet layer, each of the at least one metamaterial sheet layer comprises a substrate, and first man-made microstructures and second man-made microstructures arranged in an array form respectively on the substrate, each of the first man-made microstructures has a principal optical axis parallel to a first electric field direction, each of the second man-made microstructures has a principal optical axis parallel to a second electric field direction, the metamaterial comprises a first region and a second region, the first man-made microstructures in the first region have the largest geometric size and the first man-made microstructures in other regions increase in geometric size continuously in a direction towards the first region, the second man-made microstructures in the second region have the largest geometric size and the second man-made microstructures in other regions increase in geometric size continuously in a direction towards the second region.

5. The metamaterial for separating an electromagnetic wave beam of claim 4, wherein the first man-made microstructures and the second man-made microstructures are arranged on two opposite surfaces of the substrate in an array form respectively.

6. The metamaterial for separating an electromagnetic wave beam of claim 4, wherein the metamaterial comprises a plurality or metamaterial sheet layers having inhomogeneous dielectric constant distributions that are stacked together in a direction perpendicular to a surface of each of the sheet layers.

7. The metamaterial for separating an electromagnetic wave beam of claim 4, wherein each of the first man-made microstructures and the second man-made microstructures is of a 2D or 3D structure comprising at least one metal wire.

8. The metamaterial for separating an electromagnetic wave beam of claim 7, wherein the at least one metal wire is at least one copper wire or silver wire.

9. The metamaterial for separating an electromagnetic wave beam of claim 7, wherein the at least one metal wire is attached on the substrate through etching, electroplating, drilling, photolithography, electron etching or ion etching.

10. The metamaterial for separating an electromagnetic wave beam of claim 4, wherein the substrate is made of polymer materials, ceramic materials, ferro-electric materials, ferrite materials or ferro-magnetic materials.

11. The metamaterial for separating an electromagnetic wave beam of claim 4, wherein the first man-made microstructures and the second man-made microstructures are each of a non-90° rotationally symmetrical structure.

12. The metamaterial for separating an electromagnetic wave beam of claim 11, wherein the first man-made microstructures are each of a "⌶" form or a "王" form.

13. The metamaterial for separating an electromagnetic wave beam of claim 11, wherein the second man-made microstructures are each of an "H" form.

* * * * *